(12) United States Patent

Fang et al.

(10) Patent No.: US 12,651,328 B2

(45) Date of Patent: Jun. 9, 2026

(54) FULL-SPACE INTELLIGENT DETECTION METHOD AND SYSTEM FOR UNDERGROUND DRAINAGE NETWORKS, AS WELL AS STORAGE MEDIA

(71) Applicant: Zhengzhou University, Zhengzhou (CN)

(72) Inventors: Hongyuan Fang, Zhengzhou (CN); Niannian Wang, Zhengzhou (CN); Duo Ma, Zhengzhou (CN); Bin Sun, Zhengzhou (CN); Danyang Di, Zhengzhou (CN); Bin Li, Zhengzhou (CN); Mingming Sun, Zhengzhou (CN); Jianwei Lei, Zhengzhou (CN)

(73) Assignee: Zhengzhou University, Zhengzhou (CN)

( * ) Notice: Subject to any disclaimer, the term of this patent is extended or adjusted under 35 U.S.C. 154(b) by 258 days.

(21) Appl. No.: 18/665,411

(22) Filed: May 15, 2024

(65) Prior Publication Data

US 2025/0259289 A1    Aug. 14, 2025

(30) Foreign Application Priority Data

Feb. 12, 2024    (CN) .......................... 202410442850.0

(51) Int. Cl.
*G06T 7/00*          (2017.01)
*G06T 7/11*          (2017.01)

(52) U.S. Cl.
CPC .............. *G06T 7/0004* (2013.01); *G06T 7/11* (2017.01); *G06T 2207/20084* (2013.01)

(58) Field of Classification Search
CPC .................... G06T 7/0004; G06T 7/11; G06T 2207/20084
See application file for complete search history.

(56) References Cited

U.S. PATENT DOCUMENTS 5,947,051 A  *  9/1999  Geiger .................... E21B 41/04
                                                       114/313
2021/0010628 A1 *  1/2021  Fang ........................ F16L 55/40
                      (Continued)

FOREIGN PATENT DOCUMENTS

TW            M455865 U      6/2013

*Primary Examiner* — Dave Czekaj

(74) *Attorney, Agent, or Firm* — Getech Law LLC; Jun Ye

(57)                ABSTRACT

This invention disclosed a full-space intelligent detection method and system for underground drainage networks, as well as storage media, including the following steps: image acquisition, intelligent image denoising, internal pipe defect segmentation, concealed defect detection around the pipe, 3D reconstruction with volume quantification, and pipeline life prediction. This invention introduced a bionic four-wheel-drive, all-terrain detection robot that can effectively navigate through mud and flowing water-challenges that hinder traditional detection devices. By leveraging deep learning algorithms as well as various techniques of computing vision, 3D reconstruction, and point cloud processing, the system thoroughly analyzed collected data to determine defect types and precise locations. Utilizing this analysis, precise location of different defect type and quantitative measurement of their dimensions can be realized. Based on the data analysis results, a deep-learning driven model was developed for predicting pipeline longevity to support maintenance staff with timely information on pipe defects and operational lifespan.

8 Claims, 6 Drawing Sheets

(56) References Cited

U.S. PATENT DOCUMENTS

| | | | |
|---|---|---|---|
| 2021/0332930 A1* | 10/2021 | Tummapalli | G01B 7/24 |
| 2022/0242505 A1* | 8/2022 | Gil | B08B 9/049 |
| 2023/0101112 A1* | 3/2023 | Aguilar | G06V 20/60 |
| | | | 382/156 |
| 2025/0164412 A1* | 5/2025 | Shen | G01N 21/954 |
| 2026/0049969 A1* | 2/2026 | Park | G01N 33/222 |

* cited by examiner

FULL-SPACE INTELLIGENT DETECTION METHOD AND SYSTEM FOR UNDERGROUND DRAINAGE NETWORKS, AS WELL AS STORAGE MEDIA

TECHNICAL FIELD

The invention involves the field of smart operation and maintenance technologies for municipal drainage networks, and specifically involves a method and system for full-space intelligent detection of underground drainage networks, as well as storage media.

BACKGROUND

With the rapid development of underground drainage network construction and the aging and disrepair of numerous in-service projects, engineering safety hazards are increasingly prominent. Common issues such as leakage, corrosion, subsidence, cracking, and siltation lead to environmental pollution, urban waterlogging, road collapses, and other frequent accidents, causing significant losses and social impact.

The underground drainage network is a linear and concealed urban project with an extremely complex geological environment, making detection and repair difficult. The traditional methods of defect detection and excavation repair can hardly meet the requirements of modern urban development. Key scientific and technical problems in the safe operation and maintenance of underground drainage pipelines need to be solved urgently, and the research and development of new technologies, methods, and equipment for the detection of defects in drainage networks have significant importance in preventing and controlling underground soil and water pollution and reducing the occurrence of urban road collapses.

Statistical analysis of existing Chinese and international pipeline inspection robots shows that different achievements have been made in the field of pipeline operation robots both domestically and internationally, which are mainly applied to pipeline inspection and maintenance. These pipeline inspection robots mainly have functions such as crawling and rotation, return-to-base, photo storage, high-definition, and automatic report generation.

However, the existing technical methods still have the following shortcomings: (1) The internal environment of the pipelines is complex, with the presence of obstacles such as water, no water, barriers, and tree roots, which affect the crawling of the pipeline robots; (2) There is a large amount of fog inside the pipeline, and the rapid movement of the robots causes motion blur in the images, greatly impacting data collection; (3) Human eye detection is inefficient, time-and efforts consuming, and the collected defect images cannot be intelligently quantified for defect area, volume, and quantity; (4) The stability and anti-interference ability of the existing intelligent pipeline detection methods are poor, the data is not detailed enough to restore the three-dimensional model of the internal environment of the pipeline; (5) The assessment report cannot accurately judge the pipeline life and its service life, failing to provide effective suggestions for pipeline maintenance.

In summary, the existing drainage pipeline inspection methods mainly have the following three pain points:

One: Cannot move properly. The operating conditions of drainage pipelines are complex, with siltation and water commonly seen. The current wheeled inspection robots cannot conduct detection in water environments and are prone to slippage in silted environments.

Two: Cannot inspect properly. The drainage pipeline is severely aged and out of repair, with various defects coexisting like detached pipe circumference, loose surrounds, corrosion, and cracks. The current video detection cannot identify the pipe defects, nor can it quantify the pipe body defects, and the detection accuracy in low-light environments is poor.

Three: Cannot judge accurately. The performance evaluation of drainage pipelines is based on weighted statistics from video inspection results, ignoring the coupled impact of the complex service environment (operation, traffic, groundwater, etc.) and the defects around the pipe, making it difficult to predict pipe life and guide municipal maintenance decisions.

Therefore, faced with the problem of difficulties in making scientific and accurate decisions on regional drainage pipe network maintenance, it is necessary to develop a full-spatial intelligent detection method for underground drainage networks.

SUMMARY OF THE INVENTION

This invention discloses a full-space intelligent detection method and system for underground drainage networks, as well as storage media in order to solve the problems present in the existing technology.

The invention introduced a bionic four-wheel-drive, all-terrain detection robot; and, by leveraging deep learning algorithms as well as different techniques of computing vision, 3D reconstruction, and point cloud processing, the system thoroughly analyzed collected data to determine defect types and precise locations. Utilizing this analysis, it located each defect type precisely and quantitatively measured their dimensions, and a deep-learning driven model was developed or predicting pipeline longevity to support maintenance staff with timely information on pipe defects and operational lifespan, thereby facilitating a detailed assessment of pipeline conditions and generating a comprehensive report on detected internal surface defects, which solves the problems mentioned in the above background technology.

To achieve the above objectives, the invention provides the technical solution of a full-space intelligent detection method for underground drainage networks, consisting of the following steps:

S1, Image acquisition: Using a propeller-free, four-wheel-drive, all-terrain detection robot based on the Coandă effect to collect image data inside and around underground drainage pipes;

S2, Intelligent Image Denoising: Constructing the intelligent dehazing algorithm "Pipe-Dehaze-Net" to solve the problem of low resolution of defect boundaries caused by fog, and preprocess the collected drainage pipe images;

S3, Internal Pipe Defect Segmentation: Building an internal pipe defect segmentation model based on Mask R-CNN, segmenting the defects in the preprocessed drainage pipe images, and obtaining the pixel dimensions of the internal defects for the assessment of pipe defect;

S4, Concealed Defect Detection Around the Pipe: Establishing a concealed defect detection model around the pipe based on Mobilenet-SSD to get the location and quantity information of the defects around the pipe;

S5, 3D Reconstruction and Volume Quantification: Using a deep learning-based 3D point cloud segmentation algorithm to detect defects in reconstructed point clouds and obtain the accurate position and type of internal defects; combining parameterized point cloud projections with the damaged surface for registration, and automatically completing the 3D reconstruction and volume quantification of the defects using an adaptive ball pivoting algorithm;

S6, Pipeline Life Prediction: Using a particle swarm optimization algorithm to predict the lifespan of pipelines and produce a pipeline inspection report.

Preferably, the propeller-free four-wheel-drive all-terrain detection robot is composed of: a vision sensor module, a ballast tank device for adjusting the center of gravity to achieve the floating-up and diving-down of the detection robot, a helical propulsion system, a power device for driving the helical propulsion unit to rotate forward and backward, a cable and an underwater lighting lamp for illumination;

The vision sensor module comprises a spherical camera (1), an infrared camera (2), and a ground-penetrating radar (3). Cable (4) is responsible for transmitting control signals from the user and transmitting back visual data from the vision sensor module. There are four helical propulsion units (5), two located on each side of the bottom of the detection robot, one in the front and one in the back. Helical propulsion unit (5) consists of a drum and spiral blades, the spiral blades of the helical propulsion units on both sides are mounted in opposite directions. The drum rotates around the axis to provide the driving force, and the spiral blades are fixedly wrapped around the external surface of the drum at a certain helical angle and interact with the external environment as the drum rotates. The helical angle stated is 30° and the blade height of the screw blade is 2.4 cm;

During the image-capturing progress through underground drainage networks by the propeller-free our-wheel-drive all-terrain detection robot, the individual helical propulsion unit on each side can be divided into the following three conditions depending on the inspection environment of the drainage pipe:

(1) Under the condition of water storage: while the drum drives the spiral blades to rotate, the surface of the drum and the spiral blades also drive the water in the spiral channel to rotate, accelerating its flow rate and spirally discharging it backwards. Therefore, there is a certain flow velocity gradient between the water flow in this area and the surrounding water flow. The component of shear stress caused by this velocity gradient in the forward direction becomes most of the propelling force of the drum, while the component perpendicular to the forward direction becomes the lateral slip thrust;

(2) When in a muddy environment: The spiral blades easily cut into the mud through rotation, forming a distinctive three-dimensional elliptical shearing path. The shear stress generated by the mud being compressed and deformed along this elliptical path generates a propulsive force greater than that under water storage conditions;

(3) When in hard ground conditions: The primary interaction position is at the contact surface between the spiral blades and the pipe. The frictional traction force generated allows it to continue moving forward. The more complicated the road surface is, the greater the corresponding traction force will be.

When the detection robot moves forward to collect images in the underground drainage pipe network, the magnitude and direction of the forces on the two sides change since the spiral blades of the opposing helical propulsion units are mounted in opposite directions, thereby realizing straight forward moving ahead or turning. The helical propulsion units on both sides are considered as the left and right wheels of the detection robot, expressed as follows:

1) When the left and right wheels rotate outward in opposite directions, the left wheel is subject to a leftward force and a forward force and the right wheel to a rightward force and a forward force. The leftward and rightward forces are offset, resulting in overall forward movement;

2) When the left and right wheels rotate inward in opposite directions, the forces acting on the wheels are the reverse of the above, ultimately resulting in the robot moving backward as a whole;

3) When both wheels rotate to the right in the same direction: in soft ground conditions, the left wheel is subject to backward and rightward forces and the right wheel to forward and rightward forces, resulting in the robot turning to the left; in hard ground conditions, the spiral blades become ineffective, the overall forces are rightward, and the robot shifts to the right side;

4) When both wheels rotate to the left in the same direction: with the force directions being opposite to the ones above, the robot turns to the right in soft ground conditions and shifts to the left in hard ground conditions.

Preferably, in step S2, the basic block structure of the "Pipe-Dehaze-Net" algorithm consists of local residual learning and feature attention mechanisms in step S2. The specific preprocessing steps of the "Pipe-Dehaze-Net" algorithm are as follows:

Step S21: Input the captured drainage pipe images into "Pipe-Dehaze-Net", and the local residual learning will bypass less important feature information, which includes thin gaseous areas or low frequencies, allowing the main network architecture to focus on more effective information;

Step S22: The feature attention module combines channel attention with the pixel attention mechanism. Considering that the weighted information contained in different channel features is completely different, and the distribution of haze differs on various pixels, the feature attention module handles different channels and pixels unequally;

Step S23: Based on the feature fusion structure of different levels of the attention module, the feature weights adaptively learn from the feature attention module, giving more weights to important features, retaining the shallow layer information, and transferring it to the deep layer to get the preprocessed drainage pipe image.

Preferably, in step S3, the pipe internal defect segmentation model based on Mask R-CNN includes a convolutional neural network, a region proposal network, RoIAlign, and a segmentation network. The specific steps for defect segmentation are as follows:

Step S31: Using the pre-trained convolutional network to extract features and perform top-down feature fusion based on the feature pyramid network;

Step S32: The region proposal network generates several candidate regions;

Step S33: Using DIoU-NMS to replace the non-maximum suppression algorithm to retain accurate candidate regions;

Step S34: Mapping the retained candidate regions to a fixed dimension through RoIAlign;

Step S35: The segmentation network outputs the categories of drainage pipe defects and pixel-level segmentation results.

Preferably, in step S4, the specific steps to obtain the location and quantity information of defects around the pipe are as follows:

Step S41: Detecting the layout of the measuring line, and carrying out field data collection to get the real radar data simulation radar data, and perform data processing;

Step S42: Conducting in-house data collection, including gain processing, arithmetic operation, offset processing, and static correction to interpret the artificial atlas;

Step S43: Constructing Mobilenet-SSD network, training the deep learning network model, and improving and optimizing the algorithm model through validation set data;

Step S44: Conducting automated detection and identification;

Step S45: Summarizing and analyzing the detection results.

Preferably, in step S5, the specific steps for 3D reconstruction and volume quantification are as follows:

Step S51: Obtaining the underground drainage pipe defect data, collecting the images of pipe defect, and generating 3D point cloud data;

Step S52: Data preprocessing: Performing down-sampling and noise reduction processing on the three-dimensional point cloud data since the down-sampling method pays more attention to the shape retention of the three-dimensional point cloud; Selecting the voxel meshing method to eliminate the outlier points that do not conform to the neighborhood which is caused by the 3D point cloud collection equipment during the baseline environment sampling, and the statistical outlier removal method is used to perform noise reduction processing on the three-dimensional point cloud;

Step S53: Pipe defect recognition and segmentation: Using the PointNet++network to identify and segment pipe defects. The segmented pipe surface point clouds apply the RANSAC algorithm for surface simulation to derive surface model parameters;

Step S54: Volume quantification: Segmenting the defect and project the defect point cloud according to the parameters of the pipe surface, registering it with the original defect point cloud to generate a complete defect point cloud, using the adaptive ball pivoting algorithm to generate an envelope diagram from the complete point cloud, and quantifying the volume of defect after reconstruction.

Preferably, in step S6, the specific steps of using the particle swarm optimization algorithm to predict the pipeline life are as follows:

Step S61: Selecting traffic load, operational load, depth of soil cover, corrosion depth, corrosion width, corrosion length, detachment depth, detachment width, and detachment length as main control variables;

Step S62: Establishing a database of "control variables-maximum stress of pipelines" through a series of modeling and calculations;

Step S63: With this database, leveraging machine learning algorithms to train and test and ultimately formulate a multi-parameter stress prediction model for underground drainage pipelines in complex environments;

Step S64: Performing sensitivity analysis on the contribution of each variable to the maximum stress of the pipeline, solving the regression coefficients of the multi-parameter stress prediction model of the underground drainage pipeline in the complex environment through the particle swarm optimization algorithm, and applying the obtained prediction model to predict the remaining life of the corroded underground drainage pipeline and to influence the decision of the load threshold on the old road above the old pipeline, culminating the pipeline detection report.

Furthermore, to achieve the above purpose, the invention also provides the following technical scheme: a full-space intelligent detection method for the underground drainage network, which comprises the following modules:

Image acquisition module: Using a propeller-free, four-wheel-drive, all-terrain detection robot based on the Coandă effect to collect image data inside and around underground drainage pipes.

Intelligent image denoising module: A "Pipe-Dehaze-Net" intelligent image defogging algorithm is built to solve the low resolution of defect boundaries caused by fog, and preprocess the collected drainage pipe images;

Internal pipe defect segmentation module: A pipeline defect segmentation model based on Mask R-CNN is built to segment pipe defect images pretreated by the image intelligent denoising module, and obtain the pixel dimensions of the internal defects for the assessment of pipe defect;

Module for concealed defect detection around the Pipe: Establishing a concealed defect detection model around the pipe based on Mobilenet-SSD to obtain the location and quantity information of the defects around the pipe;

Module for 3D Reconstruction and Volume Quantification: Using a deep learning-based 3D point cloud segmentation algorithm to detect defects in reconstructed point clouds and obtain the accurate position and type of internal defects; combining parameterized point cloud projections with the damaged surface for registration, and automatically completing the 3D reconstruction and volume quantification of the defects using an adaptive ball pivoting algorithm;

Pipeline Life Prediction module (160): Using a particle swarm optimization algorithm to predict the lifespan of pipelines and produce a pipeline inspection report.

Furthermore, to achieve the above purpose, the invention also provides the following technical scheme of an electronic device comprising a processor; and a memory, used for storing one or more programs;

When one or more programs are executed by the processor, the processor is enabled to perform the full-space intelligent detection method for the underground drainage network described.

Furthermore, to achieve the above purpose, the invention also provides the following technical scheme for a computer-readable storage medium that stores a computer program. When the computer program is executed by the processor, it implements the full-space intelligent detection method for the underground drainage network described.

The advantages of this invention include:

1) Utilizing principles from biomimetics, Generative Adversarial Networks (GANs), and finite element analysis, this invention has innovated a spiral propulsion mechanism more suitable for pipeline navigation (equivalent to the wheel of a robot). This mechanism features a unique spiral drum structure, forming a hollow cylindrical shape. It is ingeniously designed with gear mechanisms, which allow the drums to rotate around a fixed central axis, and the spiral vanes on the drum's outer surface are specifically tailored in pitch and height based on the terrain requirements;

2) Recognizing the significance of volume and depth information in assessing pipeline integrity, the detection robot devised by this invention advances beyond basic defect identification based on computer visioning. It incorporates 3D point cloud imaging and leverages deep learning algorithms for a precise and efficient extraction of three-dimensional features of pipeline defects, offering effective information for defect quantification such as volume and depth;

3) Building on the ability to identify defect regions and quantify their dimensions, this invention selects external factors such as traffic loads, and quantifiable aspects of pipeline defects, like corrosion and void depth, as main control variables. By employing deep learning for training and testing, it introduces a sophisticated multi-parametric stress prediction model for complex environmental underground (concrete) drainage pipes. This model, further conducts sensitivity analyses on key stress-contributing factors and is utilized to predict the remaining lifespan of drainage pipes and assist the decision-making for load threshold of roads overlying old networks. The development of this predictive model is of scientific significance in enhancing the assessment system for the service performance of existing underground drainage pipelines.

In the figures, 1—spherical camera; 2—infrared camera; 3—ground penetrating radar; 4—cable; 5—helical propulsion unit; 6—underwater lighting; 110—image acquisition module; 120—intelligent image denoising module; 130—internal pipe defect segmentation module; 140—detection Module for concealed defect detection around the Pipe; 150—3D reconstruction and volume quantification module; 160—pipeline life prediction module; 210—processor; 220—memory.

DETAILED DESCRIPTION

The following will describe the technical solutions in the embodiments of this invention clearly and completely based on the drawings. The described embodiments are clearly only a part of the embodiments of this invention, not all embodiments. All other embodiments obtained by those skilled in the art based on the embodiments of this invention, without making creative work, fall within the protection scope of this invention.

Embodiment 1

Figure 1:
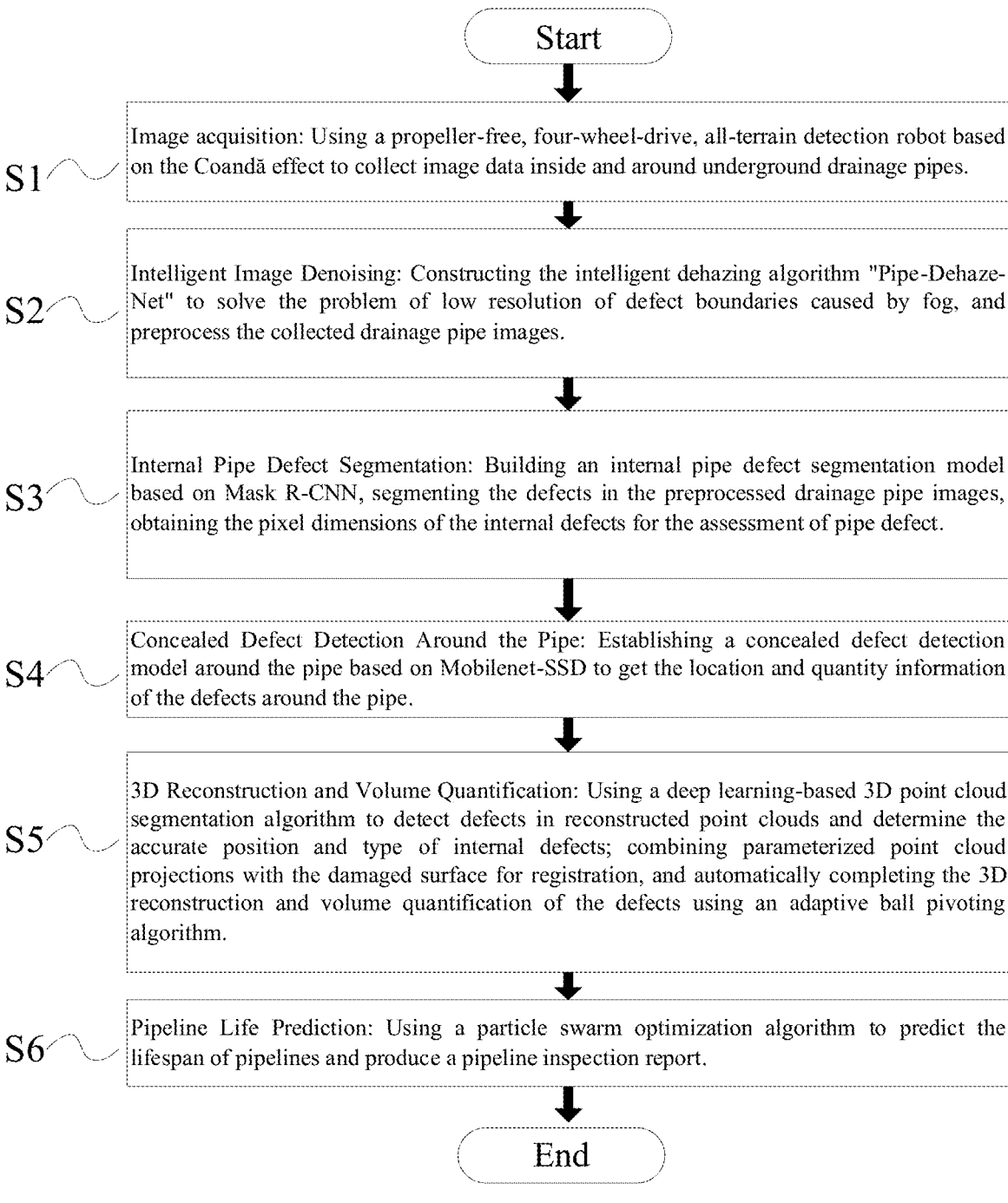
FIG. 1 is a schematic diagram of the step flow of the full-space intelligent detection method for the underground drainage pipe network in Embodiment 1 of this invention.

This embodiment of the invention provides a technical solution of a full-space intelligent detection method for an underground drainage pipe network, as shown in FIG. 1, comprising the following steps:

S1, Image acquisition: Using a propeller-free, four-wheel-drive, all-terrain detection robot based on the Coandă effect to collect image data inside and around underground drainage pipes. By adopting a helical structure for generating propulsive force, the bionic four-wheel-drive, all-terrain detection robot effectively navigates through mud and flowing water-challenges that hinder traditional detection devices.

The above propeller-free four-wheel-drive all-terrain detection robot is composed of a vision sensor module, a ballast tank device for adjusting the center of gravity to achieve the floating-up and diving-down of the detection robot, a helical propulsion system 5, a power device for driving the helical propulsion unit to rotate forward and backward, a cable 5, and an underwater lighting lamp for illumination 6.

The ballast tank device used for adjusting the center of gravity to achieve the floating-up and diving-down of the detection robot, maintains a certain stability height, reduces vibration during operation, and increases stability during operation.

All the above devices and mechanisms are modularly assembled and installed, and necessary detection and repair equipment can be installed according to the actual needs of users, avoiding problems such as excessive volume or self-weight, and complex control system structure, caused by excessive equipment.

Figure 2:
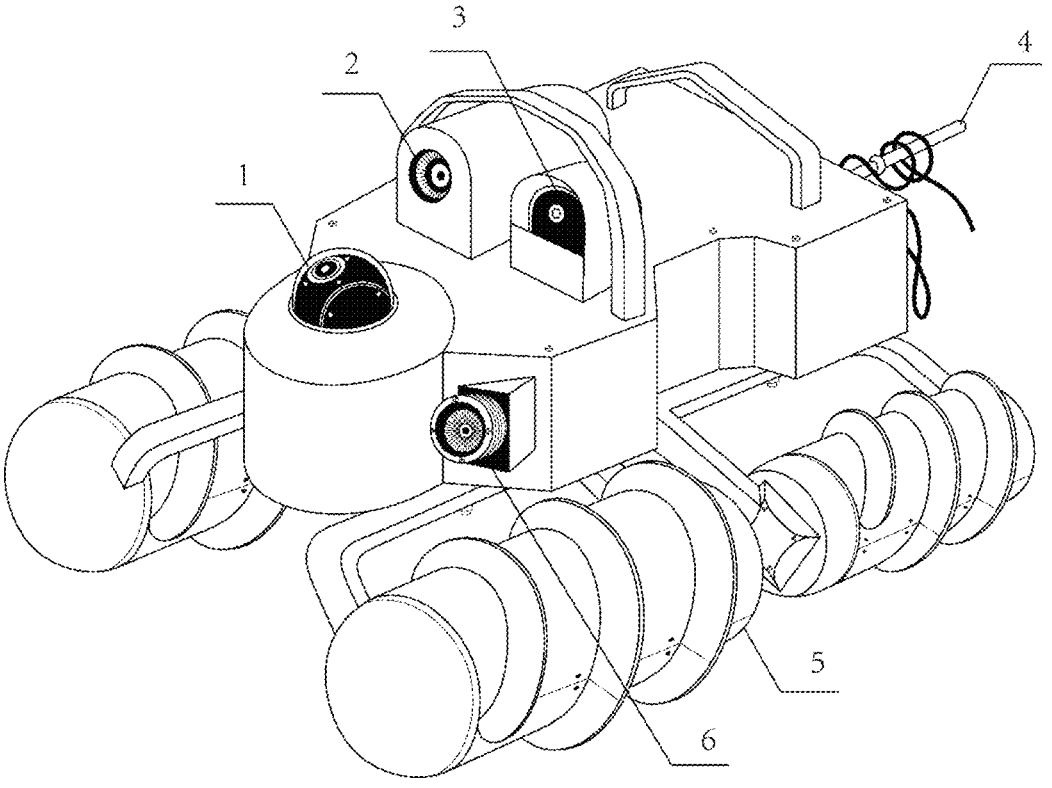
FIG. 2 is a schematic diagram of the structure of the bionic four-wheel-drive all-terrain detection robot in Embodiment 1 of this invention.

As shown in FIG. 2, the vision sensor module comprises a spherical camera 1, an infrared camera 2, and a ground-penetrating radar 3, for collecting visible light, two-dimensional images under dark conditions, and three-dimensional point cloud data, respectively. The spherical camera 1 supports 4× optical zoom and has 2 million pixels; the infrared camera 2 has a resolution of 1280×1024 pixels, achieving a frame rate of up to 120 Hz for high-speed imaging; the ground-penetrating radar 3 is an Intel L515 solid-state radar, with a depth field of view of 70°×55° (±2°), a minimum depth distance of 0.25 meters, an RGB sensor resolution of 1920×1080, and a frame frequency of 30 FPS.

Cable 4 is used for transmitting control signals from the user and transmitting back visual data from the vision sensor module; the helical propulsion unit 5 effectively eliminates the entanglement of floating objects and linear objects within the pipeline due to its propeller-free structure. The underwater lighting 6 is an AUV underwater light with a power of 20 W and brightness of 2,200 lumens. There are a total of four helical propulsion units 5, which are set on each side of the bottom of the detection robot, one in front and one in the back. Helical propulsion units 5 consists of a drum and spiral blades, and the spiral blades of the helical propulsion units on both sides are mounted in opposite directions. The drum rotates around the axis to provide the driving force, and the spiral blades are fixedly wrapped around the external surface of the drum at a certain helical angle and interact with the external environment as the drum rotates.

Figure 3:
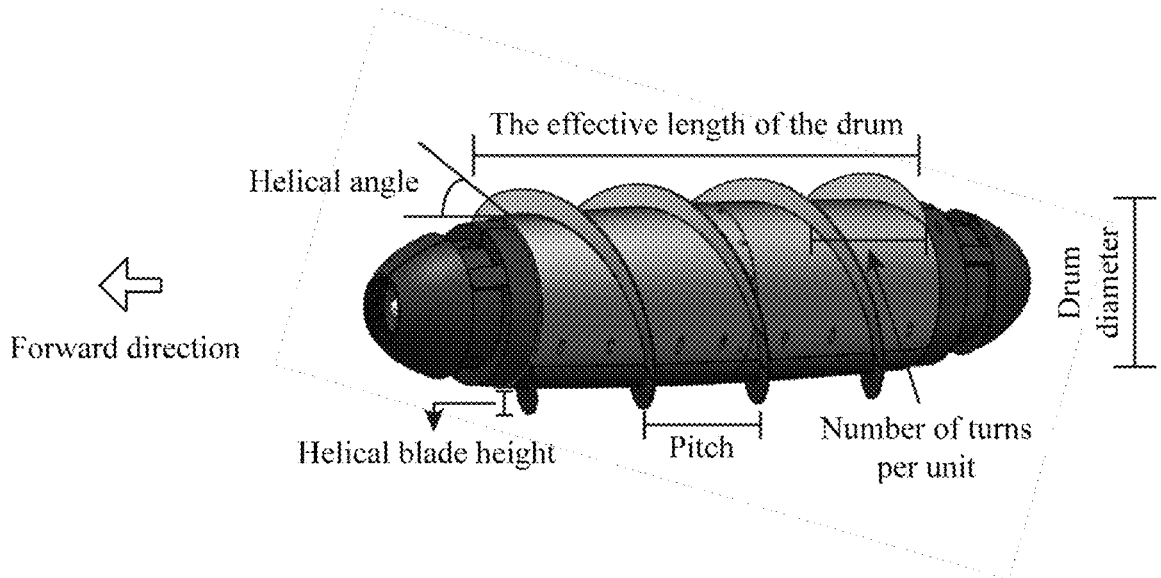
FIG. 3 is a schematic diagram of the helical propulsion unit and its parameters in Embodiment 1 of this invention.

By introducing a helical structure as the propulsion force-generating mechanism, an optimization platform was designed coupled with a MIGA optimization algorithm module, helical structure reconstruction module, automated numerical simulation module, and target solving discrimination module. Simulation calculations were performed under the conditions of water storage and siltation. Combined with the drum diameter, pitch, number of turns per unit, and the effective length of the drum, as shown in FIG. 3, the final optimized structure was determined to have a helix angle of 30° and blade height of 2.4 cm as design parameters, achieving optimal hydrodynamic characteristics. Therefore, this embodiment uses a helix angle of 30° to ensure that the driving force is sufficiently large while the wheel, i.e., the helical propulsion unit, is subjected to minimal force, thereby extending the service life of the wheel.

During the image-capturing progress through underground drainage networks by the propeller-free our-wheel-drive all-terrain detection robot, the individual helical propulsion unit on each side can be divided into the following three conditions depending on the inspection environment of the drainage pipe:

(1) Under the condition of water storage: while the drum drives the spiral blades to rotate, the surface of the drum and the spiral blades also drive the water in the spiral channel to rotate, accelerating its flow rate and spirally discharging it backwards. However, the viscosity of the fluid itself will hinder its movement and development, and there is a certain velocity gradient between the water flow in this area and the surrounding water flow, hence the closer it gets to the contact surface the closer the larger the gradient value will be. The component of shear stress caused by this velocity gradient in the forward direction becomes most of the propelling force of the drum, while the component perpendicular to the forward direction becomes the lateral slip thrust;

(2) In a muddy environment: generally, water flow refers to a Newtonian fluid, whose shear stress is often related to the flow velocity gradient; while solid refers to an elastic body, whose shear stress production is often related to strain. The silt environment with a high water content mud exhibits properties between the two and can be seen as semi-fluid soil. The spiral blades easily cut into the mud through rotation, forming a distinctive three-dimensional elliptical shearing path. The shear stress generated by the mud being compressed and deformed along this elliptical path generates a propulsive force greater than that under water storage conditions.

(3) When in hard ground conditions: The primary interaction point is at the contact surface between the spiral blades and the pipe. In this case, the propelling force is not as strong as in soft ground environments like water storage or silt accumulation, but the frictional traction force generated allows it to continue moving forward. The more complicated the road surface is, the greater the corresponding traction force will be. Moreover, this condition of waterless, defect-free road surface is relatively rare in actual testing, with more often being soft ground environments (water storage and silt environment).

When the detection robot moves forward to collect images in the underground drainage pipe network, the magnitude and direction of the forces on the two sides change since the spiral blades of the opposing helical propulsion units are mounted in opposite directions (coupled traction movement). Thereby the purpose of straight forward moving or turning can be realized through adjusting the rotation direction and speed of the two drums and helical blades. The helical propulsion units on both sides are considered as the left and right wheels of the detection robot, expressed as follows:

1) When the left and right wheels rotate outward in opposite directions, the left wheel is subject to a leftward force and a forward force and the right wheel to a rightward force and a forward force. The leftward and rightward forces are offset, resulting in overall forward movement;

2) When the left and right wheels rotate inward in opposite directions, the forces acting on the wheels are the reverse of the above, ultimately resulting in the robot moving backward as a whole;

3) When both wheels rotate to the right in the same direction: in soft ground conditions, the left wheel is subject to backward and rightward forces and the right wheel to forward and rightward forces, resulting in the robot turning to the left; in hard ground conditions, the spiral blades become ineffective, the overall forces are rightward, and the robot shifts to the right side;

4) When both wheels rotate to the left in the same direction: with the force directions being opposite to the ones above, the robot turns to the right in soft ground conditions and shifts to the left in hard ground conditions.

The different rotation speeds also result in different magnitudes of force; the greater the rotation speed, the larger the flow velocity gradient generated, the greater the force received, and the greater the propelling force. By adjusting the rotation speed of the left and right wheels, the speed of straight-line movement and the turning radius can be changed. However, considering the accuracy of the related detection equipment, the standard stipulates that when the pipe diameter does not exceed 200 mm, the forward speed of direct photography should not exceed 0.1 m/s; when the pipe diameter is greater than 200 mm, the forward speed of direct photography should not exceed 0.15 m/s, so the forward speed should be set prudently. Based on the force analysis of the helical structure, the hydrodynamic characteristics of the variable parameters (helix angle, helical blade height) of the helical structure are optimized under different working conditions, with the maximum propulsion force of the model as the optimization goal.

Figure 4:
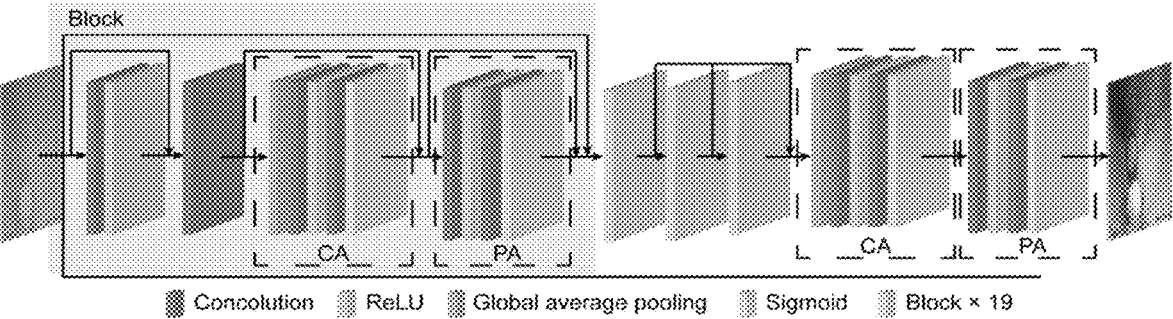
FIG. 4 is a network structure diagram of the deep learning-based image dehazing algorithm in Embodiment 1 of this invention.

S2, Intelligent Image Denoising: Constructing an intelligent dehazing algorithm "Pipe-Dehaze-Net", as shown in FIG. 4, to preprocess the collected drainage pipe images and eventually to solve the problem of low defect boundary resolution caused by haze, improving detection accuracy. The basic block structure of the "Pipe-Dehaze-Net" algorithm consists of local residual learning and feature attention mechanisms.

The specific preprocessing steps of the "Pipe-Dehaze-Net" algorithm are as follows:

Step S21: Input the captured drainage pipe images into "Pipe-Dehaze-Net", and the local residual learning will bypass less important feature information, which includes thin gaseous areas or low frequencies, allowing the main network architecture to focus on more effective information;

Step S22: The feature attention module combines channel attention with the pixel attention mechanism. Considering that the weighted information contained in different channel features is completely different, and the distribution of haze differs on various pixels, the feature attention module handles different channels and pixels unequally. This provides additional flexibility for processing different types of information and improves the expression power of the convolutional neural network.

Step S23: Based on the feature fusion structure of different levels of the attention module, the feature weights adaptively learn from the feature attention module, giving more weights to important features, retaining the shallow layer information, and transferring it to the deep layer to get the preprocessed drainage pipe image.

A pipeline defect segmentation model based on Mask R-CNN is built to segment pipe defect images pretreated by the image intelligent denoising module and obtain the pixel dimensions of the internal defects for the assessment of pipe defect. The internal pipe defect segmentation model based on Mask R-CNN includes a convolutional neural network, a region proposal network, RoIAlign, and a segmentation network.

The specific steps of disease segmentation are as follows:

Step S31: extracting features by using a pre-trained convolution network, and performing feature fusion from top to bottom based on the feature pyramid network;

Step S32, generating a plurality of candidate areas by the area suggestion network;

Step S33: DIoU-NMS is adopted to replace the non-maximum suppression algorithm and the accurate candidate region is reserved;

S34: Mapping the reserved candidate regions to a fixed dimension through RoIAlign;

Step S35: The segmentation network outputs the categories of drainage pipe defects and pixel-level segmentation results.

Figure 5:
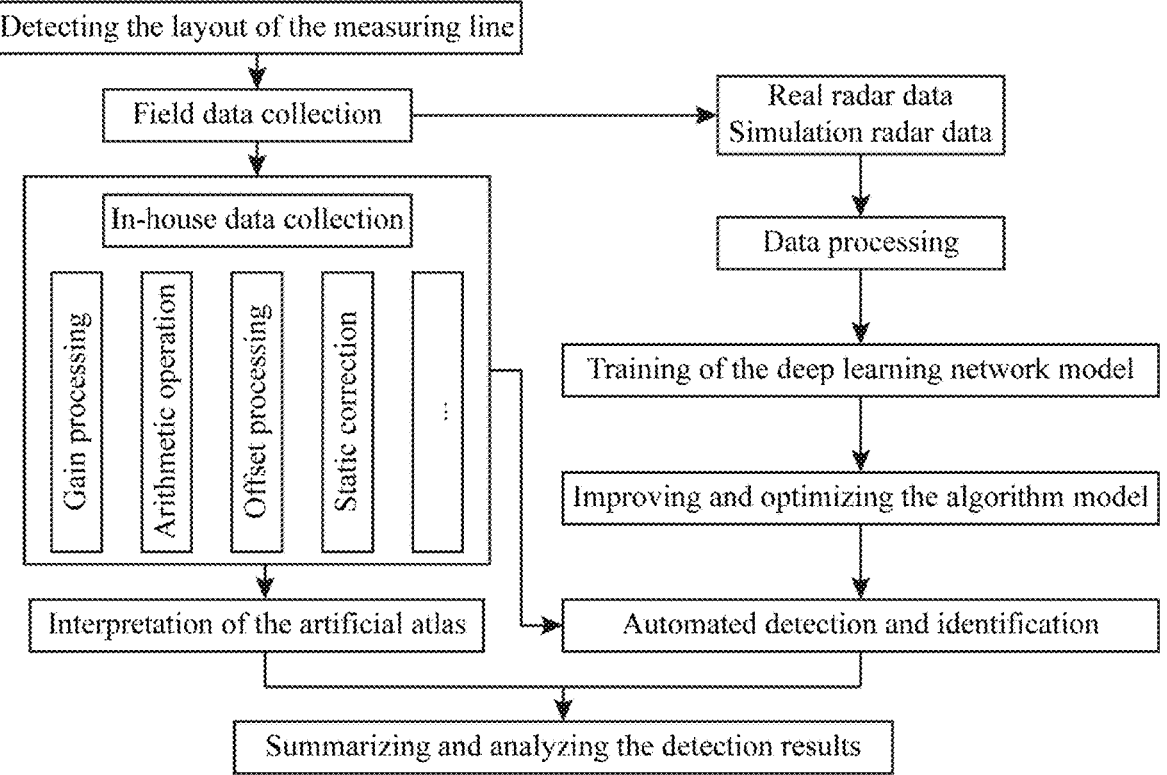
FIG. 5 is an intelligent detection flowchart of defects around the pipe in Embodiment 1 of this invention.

S4, Concealed Defect Detection Around the Pipe: As shown in FIG. 5, establishing a concealed defect detection model around the pipe based on Mobilenet-SSD to obtain the location and quantity information of the defects around the pipe;

The specific steps of obtaining the location and quantity information of peritubular diseases are as follows:

Step S41: Detecting the layout of the measuring line, and carrying out field data collection, to get the real radar data simulation radar data, and perform data processing;

Step S42: Conducting in-house data collection, including gain processing, arithmetic operation, offset processing, and static correction to interpret the artificial atlas;

Step S43: Constructing Mobilenet-SSD network, training the deep learning network model, and improving and optimizing the algorithm model through validation set data;

Step S44: Conducting automated detection and identification;

Step S45: Summarizing and analyzing the detection results.

Figure 6:
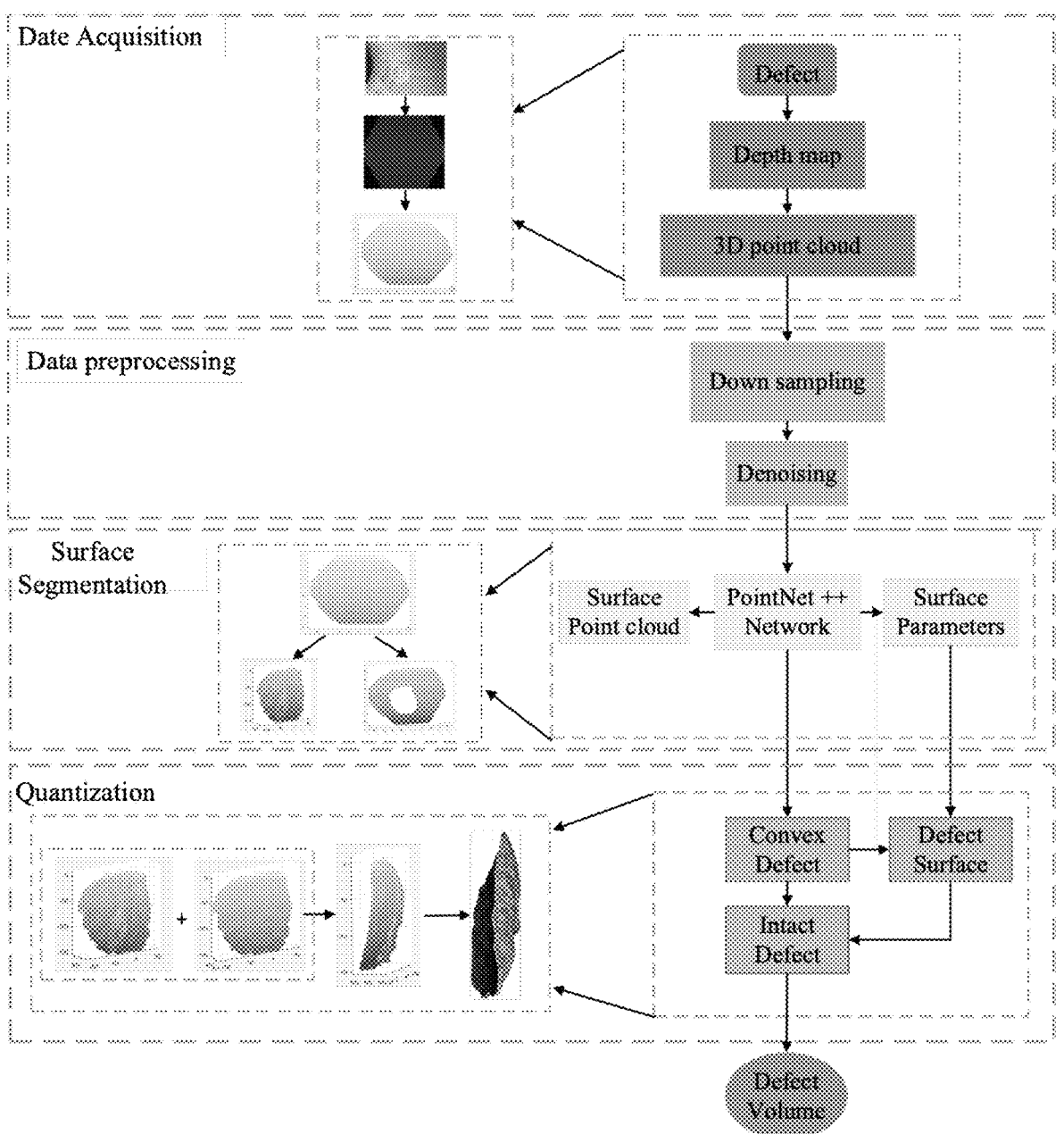
FIG. 6 is a flowchart of 3D point cloud data processing in Embodiment 1 of this invention.

S5, 3D Reconstruction and Volume Quantification: As shown in FIG. 6, using a deep learning-based 3D point cloud segmentation algorithm to detect defects in reconstructed point clouds and obtain the accurate position and type of internal defects; combining parameterized point cloud projections with the damaged surface for registration, and automatically completing the 3D reconstruction and volume quantification of the defects using an adaptive ball pivoting algorithm;

The specific steps for 3D reconstruction and volume quantification are as follows:

Step S51: Obtaining the underground drainage pipe defect data, collecting the images of pipe defect, and generating 3D point cloud data;

Step S52: Data preprocessing: Performing down-sampling and noise reduction processing on the three-dimensional point cloud data. The down-sampling method pays more attention to the shape retention of the three-dimensional point cloud since the subsequent defect volume quantification has higher requirements for the detailed representation of the three-dimensional point cloud. Selecting the voxel meshing method to eliminate the outlier points that do not conform to the neighborhood which is caused by the 3D point cloud collection equipment during the baseline environment sampling, and the statistical outlier removal method is used to perform noise reduction processing on the three-dimensional point cloud.

Step S53: Pipe defect recognition and segmentation: Using the PointNet++network to identify and segment pipe defect. The segmented pipe surface point clouds apply the RANSAC algorithm for surface simulation to derive surface model parameters.

Step S54: Volume quantification: Segmenting the defects and project the defect point cloud according to the parameters of the pipe surface, registering it with the original defect point cloud to generate a complete defect point cloud, using the adaptive ball pivoting algorithm to generate an envelope diagram from the complete point cloud, and quantifying the volume of defect after reconstruction.

S6, Pipeline Life Prediction: Using a particle swarm optimization algorithm for predicting the lifespan of pipelines and producing a pipeline inspection report.

The specific steps of using the particle swarm optimization algorithm to predict the pipeline life are as follows:

Step S61: Selecting traffic load, operational load, depth of soil cover, corrosion depth, corrosion width, corrosion length, detachment depth, detachment width, and detachment length as main control variables.

Step S62: Establishing a database of "control variables-maximum stress of pipelines" through series of modeling and calculations;

Step S63: With this database, leveraging machine learning algorithms to train and test and ultimately formulate a multi-parameter stress prediction model for underground drainage pipelines in complex environments;

Step S64: Performing sensitivity analysis on the contribution of each variable to the maximum stress of the pipeline, solving the regression coefficients of the multi-parameter stress prediction model of the underground drainage pipeline in the complex environment through the particle swarm optimization algorithm, and applying the obtained prediction model to predict the remaining life of the corroded underground drainage pipeline and to influence the decision of the load threshold on the old road above the old pipeline, culminating the pipeline detection report.

In particular, in step S6, the maximum stress of the pipeline is linearly related to the traffic load, linearly related to the corrosion depth, polynomially related to corrosion width and length, and linearly related to hollowed depth, width, and length. When the overlying soil depth is less than 2.25 m, it is linearly related, and if greater than 2.25 m, it is non-linearly related. When the degree of filling is less than 0.5, it is approximately linearly related, and if greater than 0.5, it is non-linearly related. However, considering that the operational load has a minor overall impact on the pipeline, to simplify the model, a linear relationship is adopted for all. The expression of the equation between the maximum pipeline stress and dimensionless variables is partially shown in Eq. (1)-(5).

$$\frac{\sigma D^2}{P + Y D^2 h} = \frac{\alpha_1 \left(\frac{h}{D}\right)^{\beta_1} + \alpha_2 \left(\frac{p}{Y D^2 h} + 1\right)^{\beta_2}}{\alpha_3 \left(\frac{C_h}{t}\right) + \alpha_4 \left(\frac{C_1}{L}\right)^{\beta_3} + \alpha_5 \left(\frac{V_1}{L}\right)^{\beta_1} + \alpha_6 \left(\frac{V_h}{D}\right) + \alpha_7 \left(\frac{C_w}{360}\right)^{\beta_4} + \alpha_8 \left(\frac{V_w}{360}\right) + \alpha_9 n} \tag{1}$$

$$\frac{\sigma D^2}{P + Y D^2 h} = \alpha_1 \left(\frac{P}{Y D^2 h} + 1\right)^{\beta_1} + \frac{\alpha_2 \left(\frac{h}{D}\right)^{\beta_2}}{\alpha_3 \left(\frac{C_h}{t}\right) + \alpha_4 \left(\frac{C_1}{L}\right)^{\beta_3} + \alpha_5 \left(\frac{V_1}{L}\right) + \alpha_6 \left(\frac{V_h}{D}\right) + \alpha_7 \left(\frac{C_w}{360}\right)^{\beta_4} + \alpha_8 \left(\frac{V_w}{360}\right) + \alpha_9 n} \tag{2}$$

$$\frac{\sigma D^2}{P + Y D^2 h} = \alpha_1 \left(\frac{h}{D}\right)^{\beta_1} + \frac{\alpha_2 \left(\frac{p}{Y D^2 h} + 1\right)^{\beta_2}}{\alpha_3 \left(\frac{C_h}{t}\right) + \alpha_4 \left(\frac{C_1}{L}\right)^{\beta_3} + \alpha_5 \left(\frac{V_1}{L}\right) + \alpha_6 \left(\frac{V_h}{D}\right) + \alpha_7 \left(\frac{C_w}{360}\right)^{\beta_4} + \alpha_8 \left(\frac{V_w}{360}\right) + \alpha_9 n} \tag{3}$$

$$\frac{\sigma D^2}{P + Y D^3} = \frac{\frac{\alpha_1 \left(\frac{h}{D}\right)^{\beta_1}}{\left(\frac{P}{Y D^3} + 1\right)^{\beta_2}} + \frac{\alpha_2 \left(\frac{p}{Y h^3} + 1\right)^{\beta_3}}{\alpha_3 \left(\frac{C_h}{t}\right) + \alpha_4 \left(\frac{C_1}{L}\right)^{\beta_4} + \alpha_5 \left(\frac{V_1}{L}\right) + \alpha_6 \left(\frac{V_h}{D}\right) + \alpha_7 \left(\frac{C_w}{360}\right)^{\beta_5} + \alpha_8 \left(\frac{V_w}{360}\right) + \alpha_9 n}}{} \tag{4}$$

$$\frac{\sigma D^2}{P + Y D^2 h} = \frac{\frac{\alpha_1 \left(\frac{h}{D}\right)^{\beta_1}}{\left(\frac{P}{Y D^2 h} + 1\right)^{\beta_2}} + \frac{\alpha_2 \left(\frac{P}{Y D^2 h} + 1\right)^{\beta_3}}{\alpha_3 \left(\frac{C_h}{t}\right) + \alpha_4 \left(\frac{C_1}{L}\right)^{\beta_4} + \alpha_5 \left(\frac{V_1}{L}\right) + \alpha_6 \left(\frac{V_h}{D}\right) + \alpha_7 \left(\frac{C_w}{360}\right)^{\beta_5} + \alpha_8 \left(\frac{V_w}{360}\right) + \alpha_9 n}}{} \tag{5}$$

First, the regression coefficients of the multi-parameter stress prediction model of concrete drainage pipes in complex environments are solved by using the particle swarm optimization algorithm. Then, using the cross-validation strategy, result verification is made for Eq. (1)-(5). Through this solving process, each of the listed equation forms is fitted and solved one by one. It is found that the fitting effect of Eq. (5) is significantly better. Therefore, Eq. (5) is selected as the equation expression between the maximum pipe stress and the dimensionless variables, and its regression coefficients are shown in Table 1.

TABLE 1

| Regression coefficient | |
|---|---|
| Coefficient | value |
| $\alpha_1$ | 5.435 |
| $\alpha_2$ | 0.0037 |
| $\alpha_3$ | −0.2334 |
| $\alpha_4$ | −2.923 |
| $\alpha_5$ | 4.015 |
| $\alpha_6$ | 4.565 |
| $\alpha_7$ | −2.182 |
| $\alpha_8$ | 8.975 |
| $\alpha_9$ | 1.594 |
| $\beta_1$ | 0.2579 |
| $\beta_2$ | 3.191 |
| $\beta_3$ | 0.1263 |
| $\beta_4$ | 3.527 |
| $\beta_5$ | 3.823 |

Apply Eq. (5) to predict the remaining life of concrete drainage pipes under multiple defect and complex service conditions, and verify the practicality of the proposed equation. Assume that the concrete pipe contains voids, cracks, and corrosion, with the parameters involved being: h=1.3 m, P=260 kN, Vw=57.6°, Vh=19.5 cm, Vl=80 cm, Lh=2.41 cm, Ll=32.0 cm, Eb=456 MPa, Ec=130 MPa, k=0.288, Cw=57.6°, Cl=128 cm. Substituting the above parameters into 4.23 yields the functional relationship for the change in pipe stress corrosion depth. When the limit tensile strength of the pipe is known, the maximum corrosion depth Ch of the pipe can be solved.

Then, the corrosion rate of the concrete pipe is time-dependent and can be expressed by Eq. (6):

$$c = 8.05 k (su)^{3/8} j [DS] \frac{b}{PA} \tag{6}$$

Where, k is the acidity reaction factor; s is the slope of the pipe; u is the fluid velocity; j is the pH-dependent coefficient of H2S concentration; [DS] is the concentration of sulfides; A is the acid consumption capacity, A=0.29; b/P' is the ratio of water flow surface area to the exposed pipe wall area. When the above parameters are known, the corrosion rate c of the concrete pipe (how much depth corrodes per year) can be obtained based on Eq. (6). Eventually, the remaining life of the pipe in the given scenario is obtained by dividing Ch/c, thus completing the pipeline life prediction.

An intelligent detection system for the underground drainage pipe network in all spaces is formed by integrating image acquisition, intelligent image denoising algorithm, internal and surrounding defect segmentation model, 3D reconstruction and volume quantification method, and pipeline life prediction algorithm into the same architecture (Nvidia development board). An end-to-end all-terrain detection system for underground drainage pipe network is built, and a full-space intelligent detection and diagnosis equipment is developed for underground drainage pipe network. To better achieve the needs of human-computer interaction, the independently developed front-end interface meets the operator's needs in collection and integration of the internal pipe disease information. With the powerful tools of cloud service, edge detection machines, and terminal interface, cloud-edge-end collaborative work makes operation management convenient and meets the operator's needs to the greatest extent.

Figure 7:
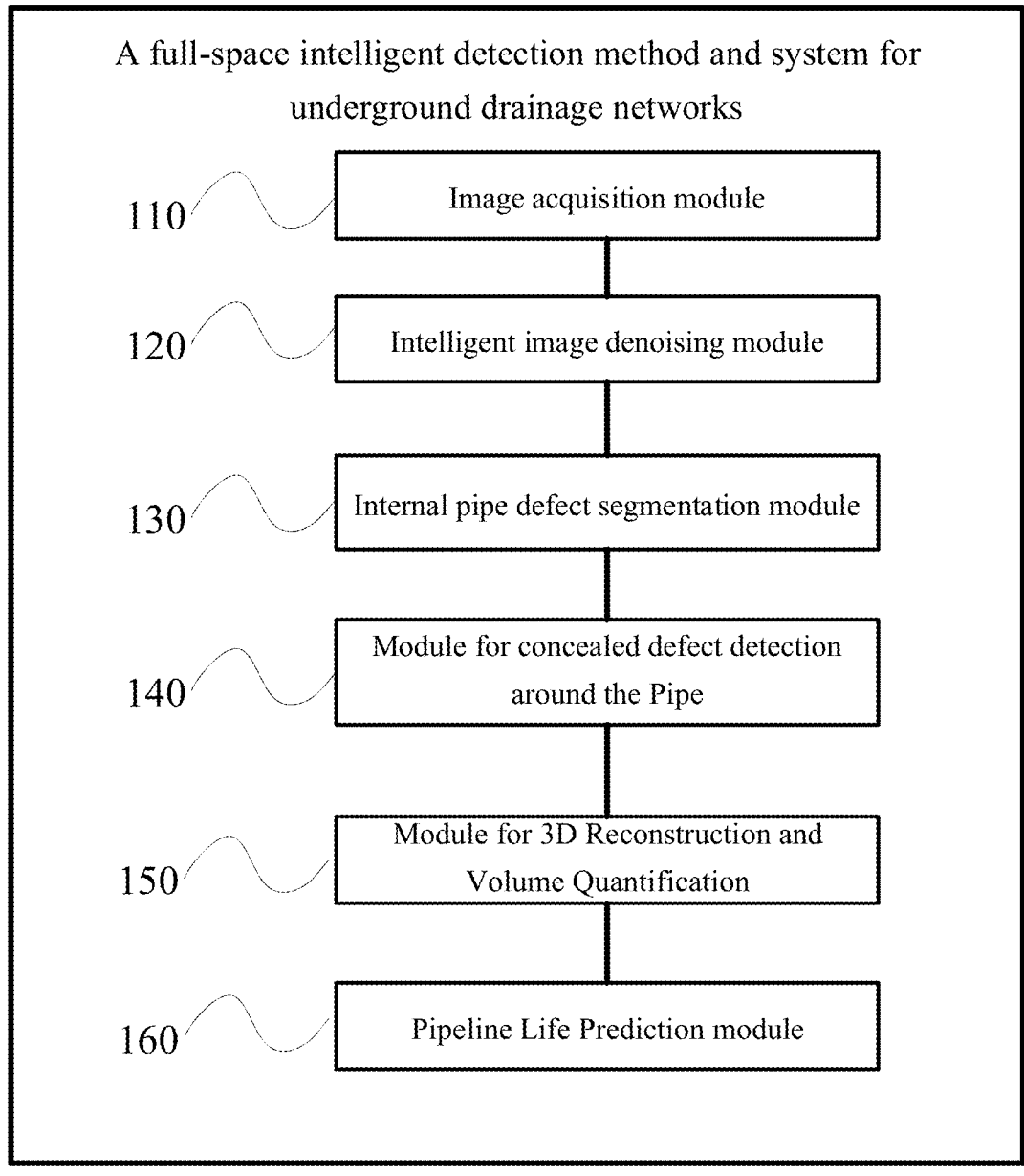
FIG. 7 is a schematic diagram of the modules for the full-space intelligent detection system for underground drainage networks of this invention.

Based on the same inventive concept as the method above, this application embodiment also provides a full-space intelligent detection system for underground drainage pipe network to implement the full-space intelligent detection method described in the above embodiment examples, as shown in FIG. 7. The detection system specifically includes:

Image acquisition module 110: Using a propeller-free, four-wheel-drive, all-terrain detection robot based on the Coandă effect to collect image data inside and around underground drainage pipes.

Intelligent image denoising module 120: A "Pipe-Dehaze-Net" intelligent image defogging algorithm is built to solve the low resolution of defect boundaries caused by fog, and preprocess the collected drainage pipe images;

Internal pipe defect segmentation module 130: A pipeline defect segmentation model based on Mask R-CNN is built to segment pipe defect images pretreated by the image intelligent denoising module (120), and obtain the pixel dimensions of the internal defects for the assessment of pipe defect;

Module for concealed defect detection around the Pipe 140: Establishing a concealed defect detection model around the pipe based on Mobilenet-SSD to obtain the location and quantity information of the defects around the pipe;

Module for 3D Reconstruction and Volume Quantification 150: Using a deep learning-based 3D point cloud segmentation algorithm to detect defects in reconstructed point clouds and obtain the accurate position and type of internal defects; combining parameterized point cloud projections with the damaged surface for registration, and automatically completing the 3D reconstruction and volume quantification of the defects using an adaptive ball pivoting algorithm;

Pipeline Life Prediction module 160: Using a particle swarm optimization algorithm to predict the lifespan of pipelines and produce a pipeline inspection report.

Figure 8:
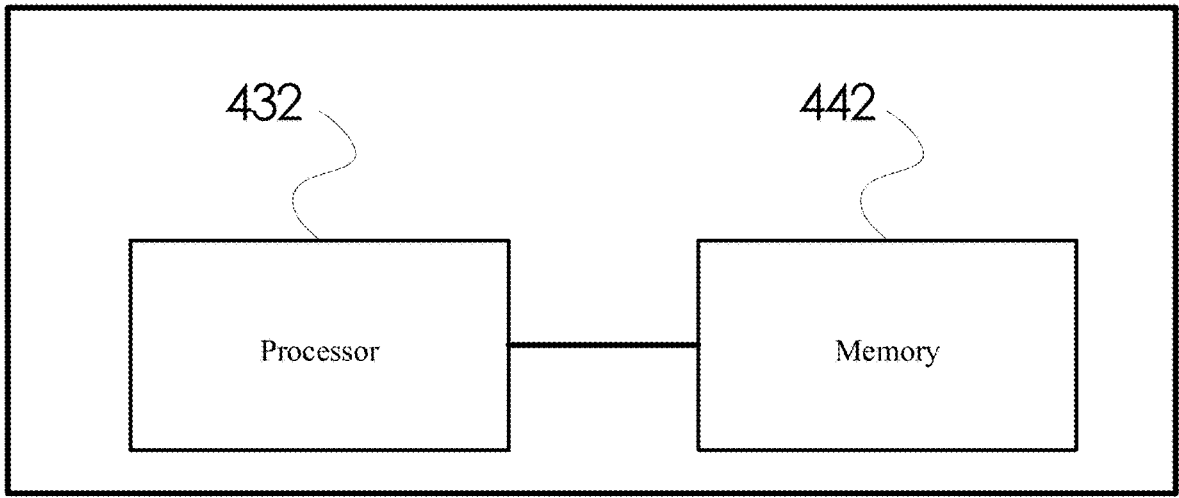
FIG. 8 is a schematic diagram of the structure of electronic devices in this invention.

Based on the same inventive concept as the method mentioned above, this application embodiment also provides an electronic device, as shown in FIG. 8, which is composed of a processor 210; and a memory 220 for storing one or more programs;

When one or more programs are executed by the processor 210, the processor is enabled to perform the full-space intelligent detection method for the underground drainage network described.

The full-space intelligent detection method for underground drainage pipe networks described comprises the following steps:

Image acquisition: Using a propeller-free, four-wheel-drive, all-terrain detection robot based on the Coandă effect to collect image data inside and around underground drainage pipes;

Intelligent Image Denoising: Constructing the intelligent dehazing algorithm "Pipe-Dehaze-Net" for solving the problem of low resolution of defect boundaries caused by fog, to preprocess the collected drainage pipe images;

Internal Pipe Defect Segmentation: Building an internal pipe defect segmentation model based on Mask R-CNN, segmenting the defects in the preprocessed drainage pipe images, obtaining the pixel dimensions of the internal defects for the assessment of pipe defect;

Concealed Defect Detection Around the Pipe: Establishing a concealed defect detection model around the pipe based on Mobilenet-SSD to obtain the location and quantity information of the defects around the pipe;

3D Reconstruction and Volume Quantification: Using a deep learning-based 3D point cloud segmentation algorithm to detect defects in reconstructed point clouds and obtain the accurate position and type of internal defects; combining parameterized point cloud projections with the damaged surface for registration, and automatically completing the 3D reconstruction and volume quantification of the defects using an adaptive ball pivoting algorithm;

Pipeline Life Prediction: Using a particle swarm optimization algorithm for predicting the lifespan of pipelines and producing a pipeline inspection report.

Based on the same invention concept as the above method embodiment, the invention also provides a computer-readable storage medium which stores a computer program. When the computer program is executed by the processor 210, it implements the full-space intelligent detection method for the underground drainage network described.

The full-space intelligent detection method for the underground drainage pipe network includes the following:

Image acquisition: Using a propeller-free, four-wheel-drive, all-terrain detection robot based on the Coandă effect to collect image data inside and around underground drainage pipes;

Intelligent Image Denoising: A "Pipe-Dehaze-Net" intelligent image defogging algorithm is built to solve the low resolution of defect boundaries caused by fog, and preprocess the collected drainage pipe images;

Internal Pipe Defect Segmentation: A pipeline defect segmentation model based on Mask R-CNN is built to segment pipe defect images pretreated by the image intelligent denoising module (120), and obtain the pixel dimensions of the internal defects for the assessment of pipe defect;

Concealed Defect Detection Around the Pipe: Establishing a concealed defect detection model around the pipe based on Mobilenet-SSD to obtain the location and quantity information of the defects around the pipe;

3D Reconstruction and Volume Quantification: Using a deep learning-based 3D point cloud segmentation algorithm to detect defects in reconstructed point clouds and obtain the accurate position and type of internal defects; combining parameterized point cloud projections with the damaged surface for registration, and automatically completing the 3D reconstruction and volume quantification of the defects using an adaptive ball pivoting algorithm;

Pipeline Life Prediction: Using a particle swarm optimization algorithm to predict the lifespan of pipelines and produce a pipeline inspection report.

The method and system of this invention can predict pipeline longevity to support maintenance staff with timely information on pipe defects and operational lifespan, thereby facilitating a detailed assessment of pipeline conditions and generating a comprehensive report on detected internal surface defects.

Although the present invention has been described in detail with reference to the embodiment, technical experts of this field can still make modifications to the technical solutions recorded in the aforementioned embodiment or perform equivalent substitutions for some technical features thereof. Any modifications, equivalent substitutions, and improvements that are made within the spirit and principles of this invention should be included within the protection scope of this invention.

What is claimed is:

1. A full-space intelligent detection method for an underground drainage network, characterized by the following steps:

S1, Image acquisition: Using a propeller-free, four-wheel-drive, all-terrain detection robot based on the Coandă effect to collect image data inside and around underground drainage pipes;

S2, Intelligent Image Denoising: Constructing an intelligent dehazing algorithm "Pipe-Dehaze-Net" to solve the problem of low resolution of defect boundaries caused by fog, and preprocess the collected drainage pipe images;

S3, Internal Pipe Defect Segmentation: Building an internal pipe defect segmentation model based on Mask R-CNN, segmenting the defects in the preprocessed drainage pipe images, obtaining the pixel dimensions of the internal defects for the assessment of pipe defect;

S4, Concealed Defect Detection Around the Pipe: Establishing a concealed defect detection model around the pipe based on Mobilenet-SSD to get the location and quantity information of the defects around the pipe;

S5, 3D Reconstruction and Volume Quantification: Using a deep learning-based 3D point cloud segmentation algorithm to detect defects in reconstructed point clouds and determine the accurate position and type of internal defects; combining parameterized point cloud projections with the damaged surface for registration, and automatically completing the 3D reconstruction and volume quantification of the defects using an adaptive ball pivoting algorithm;

S6, Pipeline Life Prediction: Using a particle swarm optimization algorithm to predict the lifespan of pipelines and generate the pipeline inspection report.

2. According to the full-space intelligent detection method for underground drainage networks described in claim 1, it is characterized in that the propeller-free four-wheel-drive all-terrain detection robot includes: a vision sensor module, a ballast tank device for adjusting the center of gravity to achieve the floating-up and diving-down of the detection robot, a helical propulsion mechanism (5), a power device for driving the helical propulsion unit to rotate forward and backward, a cable (4), and an underwater lighting lamp (6) for illumination;

The vision sensor module comprises a spherical camera (1), an infrared camera (2), and a ground-penetrating radar (3), Cable (4) is responsible for transmitting control signals from the user and transmitting back visual data from the vision sensor module; there are four helical propulsion units (5), two located on each side of the bottom of the detection robot, one in the front and one in the back; the helical propulsion unit (5) consists of a drum and spiral blades, the spiral blades of the helical propulsion units on both sides are mounted in opposite directions; the drum rotates around the axis to provide the driving force, and the spiral blades are fixedly wrapped around the external surface of the drum at a certain helical angle and interact with the external environment as the drum rotates; the helical angle stated is 30° and the blade height of the screw blade is 2.4 cm;

During the image-capturing progress through underground drainage networks by the propeller-free our-wheel-drive all-terrain detection robot, the individual helical propulsion unit on each side can be divided into the following three conditions depending on the inspection environment of the drainage pipe:

(1) Under the condition of water storage: while the drum drives the spiral blades to rotate, the surface of the drum and the spiral blades also drive the water in the spiral channel to rotate, accelerating its flow rate and spirally discharging it backwards; therefore, there is a certain flow velocity gradient between the water flow in this area and the surrounding water flow; the component of shear stress caused by this velocity gradient in the forward direction becomes most of the propelling force of the drum, while the component perpendicular to the forward direction becomes the lateral slip thrust;

(2) When in a muddy environment: The spiral blades easily cut into the mud through rotation, forming a distinctive three-dimensional elliptical shearing path; the shear stress generated by the mud being compressed and deformed along this elliptical path generates a propulsive force greater than that under water storage conditions;

(3) When in hard ground conditions: The primary interaction position is at the contact surface between the spiral blades and the pipe; the frictional traction force generated allows it to continue moving forward; the more complicated the road surface is, the greater the corresponding traction force will be;

When the detection robot moves forward to collect images in the underground drainage pipe network, the magnitude and direction of the forces on the two sides change since the spiral blades of the opposing helical propulsion units are mounted in opposite directions, thereby realizing straight forward moving or turning; The helical propulsion units on both sides are considered the left and right wheels of the detection robot, expressed as follows:

1) When the left and right wheels rotate outward in opposite directions, the left wheel is subject to a leftward force and a forward force, and the right wheel to a rightward force and a forward force; the leftward and rightward forces are offset, resulting in overall forward movement;

2) When the left and right wheels rotate inward in opposite directions, the forces acting on the wheels are the reverse of the above, ultimately resulting in the robot moving backward as a whole;

3) When both wheels rotate to the right in the same direction: in soft ground conditions, the left wheel is subject to backward and rightward forces and the right wheel to forward and rightward forces, resulting in the robot turning to the left; in hard ground conditions, the spiral blades become ineffective, the overall forces are rightward, and the robot shifts to the right side;

4) When both wheels rotate to the left in the same direction: with the force directions being opposite to the ones above, the robot turns to the right in soft ground conditions and shifts to the left in hard ground conditions.

3. The feature of the full-space intelligent detection method for the underground drainage network according to claim 1 is that the basic block structure of the "Pipe-Dehaze-Net" algorithm consists of local residual learning and feature attention mechanisms in step S2; the specific preprocessing steps of the "Pipe-Dehaze-Net" algorithm are as follows:

Step S21: Input the captured drainage pipe images into "Pipe-Dehaze-Net", and the local residual learning will bypass less important feature information, which includes thin gaseous areas or low frequencies, allowing the main network architecture to focus on more effective information;

Step S22: The feature attention module combines channel attention with the pixel attention mechanism; considering that the weighted information contained in different channel features is completely different, and the distribution of haze differs on various pixels, the feature attention module handles different channels and pixels unequally;

Step S23: Based on the feature fusion structure of different levels of the attention module, the feature weights adaptively learn from the feature attention module, giving more weights to important features, retaining the shallow layer information, and transferring it to the deep layer to get the preprocessed drainage pipe image.

4. According to the full-space intelligent detection method for the underground drainage network described in claim 1, its character lies in that, in step S3, the pipe internal defect segmentation model based on Mask R-CNN includes a convolutional neural network, a region proposal network, RoIAlign, and a segmentation network; the specific steps for defect segmentation are as follows:

Step S31: Using the pre-trained convolutional network to extract features and perform top-down feature fusion based on the feature pyramid network;

Step S32: The region proposal network generates several candidate regions;

Step S33: Using DIoU-NMS to replace the non-maximum suppression algorithm to retain accurate candidate regions;

Step S34: Mapping the retained candidate regions to a fixed dimension through RoIAlign;

Step S35: The segmentation network outputs the categories of drainage pipe defects and pixel-level segmentation results.

5. According to the full-space intelligent detection method for the underground drainage network described in claim 1, its character lies in that, in step S4, the specific steps to get the location and quantity information of defects around the pipe are as follows:

Step S41: Detecting the layout of the measuring line, and carrying out field data collection to get the real radar data simulation radar data, and perform data processing;

Step S42: Conducting in-house data collection, including gain processing, arithmetic operation, offset processing, and static correction to interpret the artificial atlas;

Step S43: Constructing Mobilenet-SSD network, training the deep learning network model, and improving and optimizing the algorithm model through validation set data;

Step S44: Conducting automated detection and identification;

Step S45: Summarizing and analyzing the detection results.

6. According to the full-space intelligent detection method for the underground drainage network described in claim 1, its character lies in that, in step S5, the specific steps for 3D reconstruction and volume quantification are as follows:

Step S51: Obtaining the underground drainage pipe defect data, collecting the images of pipe defect, and generating 3D point cloud data;

Step S52: Data preprocessing: Performing down-sampling and noise reduction processing on the three-dimensional point cloud data since the down-sampling method pays more attention to the shape retention of the three-dimensional point cloud; Selecting the voxel meshing method to eliminate the outlier points that do not conform to the neighborhood which is caused by the 3D point cloud collection equipment during the baseline environment sampling, and the statistical outlier removal method is used to perform noise reduction processing on the three-dimensional point cloud;

Step S53: Pipe defect recognition and segmentation: Using the PointNet++ network to identify and segment pipe defects; the segmented pipe surface point clouds apply the RANSAC algorithm for surface simulation to derive surface model parameters;

Step S54: Volume quantification: Segmenting the defect and project the defect point cloud according to the parameters of the pipe surface, registering it with the original defect point cloud to generate a complete defect point cloud, using the adaptive ball pivoting algorithm to generate an envelope diagram from the complete point cloud, and quantifying the volume of defect after reconstruction.

7. According to the full-space intelligent detection method for the underground drainage network described in claim 1, its character lies in that, in step S6, the specific steps of using the particle swarm optimization algorithm to predict the pipeline life are as follows:

Step S61: Selecting traffic load, operational load, depth of soil cover, corrosion depth, corrosion width, corrosion length, detachment depth, detachment width, and detachment length as main control variables;

Step S62: Establishing a database of "control variables-maximum stress of pipelines" through a series of modeling and calculations;

Step S63: With this database, leveraging machine learning algorithms to train and test and ultimately formulate a multi-parameter stress prediction model for underground drainage pipelines in complex environments;

Step S64: Performing sensitivity analysis on the contribution of each variable to the maximum stress of the pipeline, solving the regression coefficients of the multi-parameter stress prediction model of the underground drainage pipeline in the complex environment through the particle swarm optimization algorithm, and applying the obtained prediction model to predict the remaining life of the corroded underground drainage pipeline and to influence the decision of the load threshold on the old road above the old pipeline, culminating the pipeline detection report.

8. According to the full-space intelligent detection method for the underground drainage network described in claim 1, its character lies in that, the detection system includes the following modules:

Image acquisition module (110): Using a propeller-free, four-wheel-drive, all-terrain detection robot based on the Coandă effect to collect image data inside and around underground drainage pipes;

Intelligent image denoising module (120): A "Pipe-Dehaze-Net" intelligent image defogging algorithm is built to solve the low resolution of defect boundaries caused by fog, and preprocess the collected drainage pipe images;

Internal pipe defect segmentation module (130): A pipeline defect segmentation model based on Mask R-CNN is built to segment pipe defect images pretreated by the image intelligent denoising module (120), and obtain the pixel dimensions of the internal defects for the assessment of pipe defect;

Module for concealed defect detection around the Pipe (140): Establishing a concealed defect detection model around the pipe based on Mobilenet-SSD to obtain the location and quantity information of the defects around the pipe;

Module for 3D Reconstruction and Volume Quantification (150): Using a deep learning-based 3D point cloud segmentation algorithm to detect defects in reconstructed point clouds and obtain the accurate position and type of internal defects; combining parameterized point cloud projections with the damaged surface for registration, and automatically completing the 3D reconstruction and volume quantification of the defects using an adaptive ball pivoting algorithm;

Pipeline Life Prediction module (160): Using a particle swarm optimization algorithm to predict the lifespan of pipelines and produce a pipeline inspection report.

\* \* \* \* \*